(No Model.)

W. A. VAN DEUSEN.
BAKING PAN.

No. 263,000. Patented Aug. 22, 1882.

Witnesses:
Frederick Harvey
Jno. M. King

Inventor
William A. Van Deusen.
per C. C. Swett.
his Attorney.

UNITED STATES PATENT OFFICE.

WILLIAM A. VAN DEUSEN, OF CLIFTON SPRINGS, NEW YORK.

BAKING-PAN.

SPECIFICATION forming part of Letters Patent No. 263,000, dated August 22, 1882.

Application filed June 12, 1882. (No model.)

*To all whom it may concern:*

Be it known that I, WILLIAM A. VAN DEUSEN, a citizen of the United States, residing at Clifton Springs, in the county of Ontario and State of New York, have invented certain new and useful Improvements in Baking-Pans; and I do hereby declare the following to be a full, clear, and exact description of the invention, such as will enable others skilled in the art to which it appertains to make and use the same.

My invention relates to improvements in baking-pans, in which narrow openings are made through the sides of the pan near the bottom, and parallel with it, of sufficient length to readily allow a case-knife or similar instrument to be inserted and passed between the contents of the pan and the pan-bottom. Adjustable covers of any desired form are provided for these apertures to prevent the escape of the contents of the pan. I prefer to use doors sliding vertically, held in place by flanges formed from the sides of the pan, and to extend the tops of these doors above the sides of the pan, for the purposes hereinafter described.

The objects of my invention are, first, to produce a handsome well-cooked loaf of cake or bread; second, to render the entire surface of the loaf easily accessible for examination while cooking, and for removal from the pan when cooked; third, to obviate the use of grease, necessary in common pans to prevent the loaf from adhering to the pan; fourth, to provide a rest above the loaf for a covering to screen it from excess of heat while cooking, or to protect it after its removal from the oven; fifth, to rapidly and properly cool the loaf while still in the pan.

By applying my invention bake-pans with perpendicular sides may be used, which will produce a loaf much more shapely and more easily frosted than the ordinary "milk-pan loaf." The absence of a greasy coating over the interior of the pan allows the cake to retain its intended flavor. In jelly-cakes especially the action of the acid in the jelly upon the fat taken from the pan by the thin layers of cake produces an unpleasant and unwholesome combination.

I attain the objects mentioned above by devices illustrated in the accompanying drawings, in which—

Figure 1:
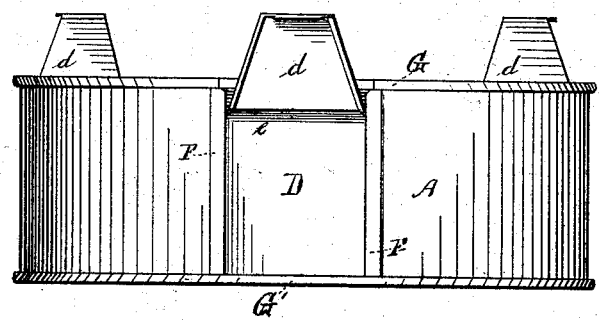
Figure 2:
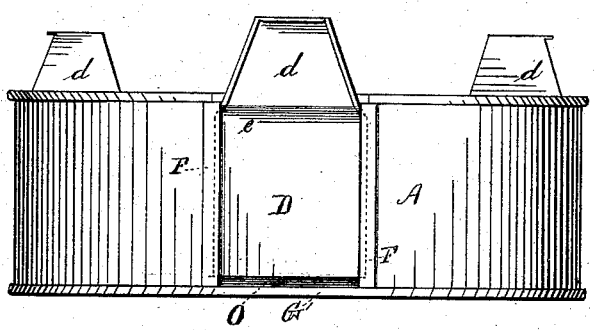
Figure 3:
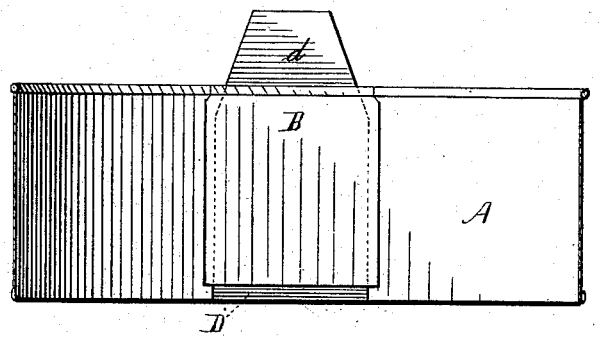

Figure 1 is a side elevation of a round bake-pan with perpendicular sides. A pan of any desired shape may be used as well. This figure shows the sliding door closed. Fig. 2 is also a side elevation of a bake-pan, but with the door open. Fig. 3 is a vertical section of the inside of the pan with the door closed down.

Similar letters refer to corresponding parts throughout the several views.

The letter A represents a bake-pan. D is a door held in place by the flanges F F. These flanges are preferably placed on the outside of the pan, and are formed by making narrow vertical folds in the sides of the pan A of sufficient width laterally to overlap the edges of the doors and hold them securely. From those parts of the sides of the pan (represented by the letter B in Fig. 3) between the folds F F are cut out narrow pieces, leaving the openings O, through which the bottom of the loaf may be examined or separated from the pan by any suitable implement.

*d d* are extensions of the doors D D, rising above the sides of the pan and forming convenient handles for opening and closing the doors, for lifting the pan itself, and furnishing rests for any covering for the pan. They are useful, also, in cooling the loaf by keeping the inverted pan containing the loaf up from the table and allowing a free circulation of air on every side. A double angle at *e* in the door D permits the extension *d* of the door to pass the projecting rim G of the pan, which rim G prevents the door from being drawn up farther than is necessary to uncover the opening O. The lower rim, G', of the pan, forming the lower side of the opening O, may be removed or flattened down or left to form a close joint with the lower edge of the door D, the better to retain the contents of the pan.

Having fully described my invention, what I desire to claim, and secure by Letters Patent, is—

1. In combination with a baking-pan, A, one or more narrow laterally-elongated openings, O, through the sides of the pan and parallel to and near the pan-bottom, said opening or openings being provided with movable coverings D, conveniently adjusted to prevent the escape of the contents of the pan, all substantially as set forth.

2. In combination with a baking-pan, A, one or more narrow laterally-elongated openings, O, through the sides of the pan and parallel to and near the pan-bottom, the said opening or openings having vertically-sliding doors D D, held in place by flanges F F, formed from the sides of the pan A, the said doors D D making at their bottoms a close joint with the lower rim, G', of the pan, and extending above the sides of the pan to form suitable handles or rests, $d\ d$, for the pan A, all constructed in the manner and for the purposes substantially as set forth.

In testimony whereof I affix my signature in presence of two witnesses.

WILLIAM A. VAN DEUSEN.

Witnesses:
W. W. ARCHER,
STANLEY C. OLMSTEAD.